United States Patent [19]

Marsh

[11] Patent Number: 5,450,719
[45] Date of Patent: Sep. 19, 1995

[54] GAS TURBINE ENGINE REAR MAGNETIC OR FOIL BEARING COOLING USING EXHAUST EDUCTOR

[75] Inventor: David N. Marsh, Phoenix, Ariz.

[73] Assignee: AlliedSignal, Inc., Morris Township, N.J.

[21] Appl. No.: 154,886

[22] Filed: Nov. 17, 1993

[51] Int. Cl.⁶ .............................. F02C 3/00; F02C 7/12
[52] U.S. Cl. .................................. 60/39.75; 60/39.83; 60/262; 415/142; 415/175; 415/180
[58] Field of Search ................. 60/39.75, 39.83, 262, 60/269; 415/115, 142, 175, 180

[56] References Cited

U.S. PATENT DOCUMENTS

| | | | |
|---|---|---|---|
| 3,057,542 | 10/1962 | Kennan et al. | 415/180 |
| 3,527,053 | 9/1970 | Horn | 415/180 |
| 3,734,639 | 5/1973 | Short | 60/39.75 |
| 4,217,755 | 8/1980 | Williams | 60/39.75 |
| 4,451,200 | 5/1984 | Libertini et al. | 415/180 |
| 4,645,415 | 2/1987 | Hovan et al. | 60/39.83 |
| 4,838,028 | 6/1989 | Witt | 415/180 |
| 5,235,812 | 8/1993 | Klaass et al. | 60/727 |
| 5,265,408 | 11/1993 | Sheoran et al. | 60/262 |

OTHER PUBLICATIONS

Installation Handbook "Airborne Gas Turbine Auxiliary Power Units" by F. A. Tomkins and Garrett Turbine Engine Company Engineering Staff, 1983.

Primary Examiner—Richard A. Bertsch
Assistant Examiner—Howard R. Richman
Attorney, Agent, or Firm—Jerry J. Holden; James W. McFarland

[57] ABSTRACT

An exhaust housing having an eductor is provided. The eductor includes an outer annular casing circumscribing an inner annular casing to define a flow path therebetween for receiving the exhaust gas from the turbine section of an engine. A plurality of struts are integral with both casings. The struts have passages that extend from the exterior of the outer casing to the interior of the inner casing. A non-oil lubricated bearing is mounted within the interior of the inner casing for journaling a rotating shaft. During operation, the kinetic energy of the high velocity exhaust gas flowing between the casings and into a tailpipe induces cooling airflow from the exterior of the exhaust section, through the passages, across the bearing, and then out to the tailpipe.

9 Claims, 1 Drawing Sheet

GAS TURBINE ENGINE REAR MAGNETIC OR FOIL BEARING COOLING USING EXHAUST EDUCTOR

SUMMARY OF THE INVENTION

An object of the present invention is to provide an exhaust housing for a gas turbine engine having means for providing cooling air flow to a non-oil lubricated bearing mounted therein.

The present invention achieves this object by providing an exhaust housing having an eductor which includes an outer annular casing circumscribing an inner annular casing to define a flow path therebetween for receiving the exhaust gas from the turbine section of the engine. A plurality of struts are integral with both casings. The struts have cooling passages that extend from the exterior of the outer casing to the interior of the inner casing. A non-oil lubricated bearing is mounted within the interior of the inner casing for journaling a rotating shaft. During operation, the kinetic energy of the high velocity exhaust gas flowing between the casings and into a tailpipe, induces a flow of cooling air from the exterior of the outer casing, through the cooling passages, across the bearing, and then out through the tailpipe.

DESCRIPTION OF THE PREFERRED EMBODIMENT

Figure 1:
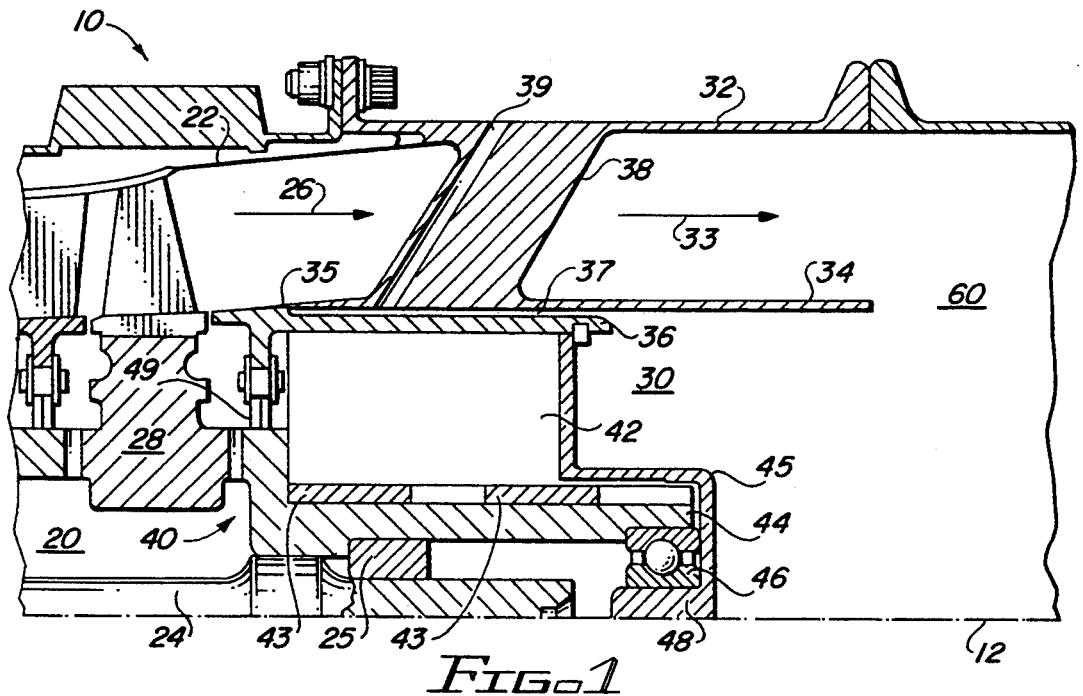
FIG. 1 is a cross sectional view of a gas turbine engine exhaust housing having a rotating shaft journalled on a magnetic bearing as contemplated by the present invention.
Figure 2:
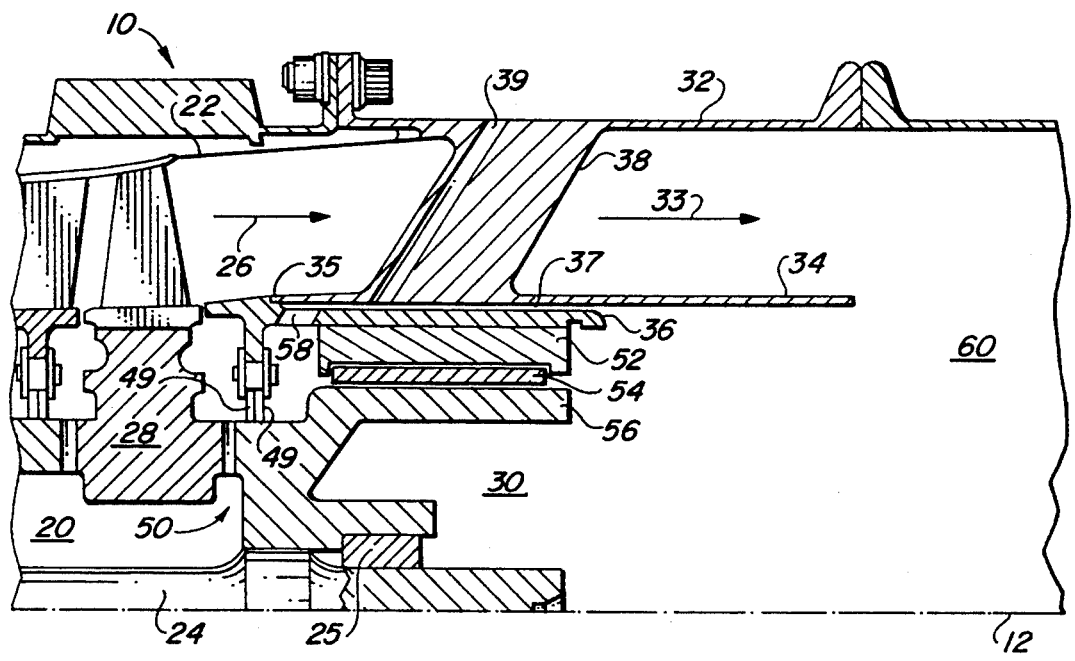
FIG. 2 is a cross sectional view of a gas turbine engine exhaust housing having a rotating shaft journalled on an air bearing as contemplated by the present invention.

FIGS. 1 and 2 show an aft portion 10 of a gas turbine engine which comprises a turbine section 20, an exhaust housing 30, and an annular tail pipe 60. The turbine section 20, which is only partially shown, includes a annular turbine casing 22 circumscribing a rotating tie shaft 24 to define a flow path 26 therebetween. The axial centerline of the shaft 24 is coincident with the engine centerline 12. A last stage turbine blade assembly 28 is mounted to the shaft 24 and is disposed in the flow path 26. The tie shaft 24 is overhung in that it extends axially beyond the turbine casing 22 into the exhaust housing 30.

The exhaust housing 30 includes an outer annular casing 32 flanged at both ends for mating with the turbine casing 22 at one end, and the tail pipe 60 at the other end. Disposed within the outer casing 32 is an inner annular casing 34 which defines a flow path 33 therebetween. In a manner familiar to those skilled in the art, the outer annular casing 32 and the inner annular casing 34 are arranged to form an eductor. A methodology for configuring the inner and outer casings 34, 32 to form an eductor can be found in Appendix A of F. A. TOMKINS & GARRETT TURBINE ENGINE COMPANY ENGINEERING STAFF, INSTALLATION HANDBOOK AIRBORNE AUXILIARY POWER UNITS (2nd ed. 1983), which is incorporated by reference. A plurality of circumferentially spaced struts 38 couple the outer casing 32 to the inner casing 34. Within the interior of the inner casing 34 is a cylindrical bearing carrier 36. The bearing carrier 36 is attached to an axial end 35 of the inner casing 34 so as to define a gap 37 therebetween. At its opposite end, the bearing carrier 36 is closed off by a bearing housing 45. The struts 38 have cooling passages 39 which place the gap 37 in fluid communication with the environment surrounding the engine 10, which is usually an aircraft compartment.

Referring to FIG. 1, a magnetic bearing 40 is mounted within the bearing carrier 36. The bearing 40 includes an annular stator 42 circumscribing an annular rotor 44 having two laminates 43 of a ferromagnetic material. The tie shaft 24 is journalled in the rotor 44 with axial tension provided by a tie nut 25. A self lubricating ball bearing 46 having a consumable graphite separator is mounted to a support member 48 that is integral with the bearing housing 45. The ball bearing 46 supports the rotor 44 in the event of a catastrophic failure. A seal 49 is disposed between the bearing carrier 36 and the annular rotor 44, to prevent the ingestion of hot gas and particles from the turbine section 20.

In an alternative embodiment, shown in FIG. 2, a conventional air or foil bearing 50 is mounted between the shaft 24 and the bearing carrier 36. The foil bearing 50 includes a foil carrier 52 carrying a plurality of overlapping foils 54. The foils 54 engage a journal 56 which is mounted to the shaft 24. In addition, the bearing carrier 36 has a plurality of air holes 58 that place the interior of the bearing 50 in fluid communication with the gap 37.

During operation of the preferred embodiment, the kinetic energy of the high velocity exhaust gas flowing through the flow path 33 and into the tailpipe 60 mixes with low velocity air flowing into the tailpipe 60 from the interior of the inner annular casing 34. Through this mixing, the kinetic energy of the exhaust gas is transferred to the low velocity air. The air is accelerated creating a drop in static pressure, that is a suction, that induces a flow of cooling air from the exterior of the outer casing 32, through the passages 39, into the gap 37, across the exterior surface of the bearing carrier 36, and then out to the tailpipe 60. The bearing house 45 seals the interior of the bearing carrier 36 from the gap 37, thereby preventing the eductor from inducing a flow of hot gas through the seal 49. Similarly, in the alternate embodiment, air flow is not only induced over the bearing carrier 36, but also through the holes 58 and foils 54. Because there is no bearing housing, the seal 49 must be configured to prevent the inducement of a hot gas flow by the eductor. To enhance the effectiveness of the eductor, mixing lobes can be added to the outer surface of the inner casing 34.

Thus, an exhaust housing for a gas turbine engine is provided having means for providing cooling air flow to non-oil lubricated bearings mounted therein.

Various modifications and alterations to the above described preferred and alternate embodiments of the exhaust housing will be apparent to those skilled in the art. For example, the cooling passages 39 can communicate with a manifold mounted on the exterior surface of the outer casing 32. Air can then be delivered to the manifold from any location in the aircraft. Accordingly, this description of the invention should be considered exemplary and not as limiting the scope and spirit of the invention as set forth in the following claims.

What is claimed is:

1. An exhaust housing disposed between a tailpipe and a turbine of a gas turbine engine comprising:
   an eductor having an outer annular casing circumscribing and radially spaced from an inner annular casing to define a flow path therebetween, said flow path receiving a flow of gas from said turbine and delivering it to said tailpipe;
   at least one strut integral with said inner and outer casings;
   a non-liquid lubricated bearing mounted to and circumscribed by said inner casing so as to define an annular gap therebetween; and
   a passageway extending from an exterior surface of said outer casing, through said strut, and to said gap, whereby the kinetic energy of said gas induces a flow of cooling air through said passageway, into said gap, and across a surface of said bearing.

2. The exhaust housing of claim 1 wherein said non-liquid lubricated bearing includes an annular bearing carrier mounted to said inner casing to define said annular gap therebetween.

3. The exhaust housing of claim 2 wherein said bearing carrier has at least one hole extending therethrough, whereby the kinetic energy of said gas induces a flow of air through said hole.

4. The exhaust housing of claim 3 wherein said non-liquid lubricated bearing is an air bearing.

5. The exhaust housing of claim 2 wherein said annular bearing carrier defines an interior chamber that is isolated from said gap by a bearing housing.

6. The exhaust housing of claim 5 wherein said bearing housing includes a self lubricating ball bearing for supporting said non-liquid lubricated bearing.

7. The exhaust housing of claim 6 wherein said non-liquid lubricated bearing is a magnetic bearing.

8. An exhaust housing disposed between a tailpipe and a turbine of a gas turbine engine comprising:
   an eductor having an outer annular casing circumscribing and radially spaced from an inner annular casing to define a flow path therebetween, said flow path receiving a flow of gas from said turbine and delivering it to said tailpipe;
   at least one strut integral with said inner and outer casings;
   a non-oil lubricated bearing mounted to and circumscribed by said inner casing and including an annular bearing Carrier, defining an interior chamber, mounted to said inner casing to define an annular gap between said inner casing and said bearing carrier;
   a bearing housing isolating the interior chamber of said bearing carrier from said gap, said bearing housing including a self lubricating ball bearing for supporting said non-oil lubricated bearing; and
   a passageway extending from an exterior surface of said outer casing, through said strut, and to said gap whereby the kinetic energy of said gas induces a flow of air through said passageway.

9. The exhaust housing of claim 8 wherein said non-oil lubricated bearing is a magnetic bearing.

* * * * *

UNITED STATES PATENT AND TRADEMARK OFFICE
CERTIFICATE OF CORRECTION

PATENT NO. : 5,450,719
DATED : Sep. 19, 1995
INVENTOR(S) : David N. Marsh

It is certified that error appears in the above-identified patent and that said Letters Patent is hereby corrected as shown below:

<u>Cover Page, Item [73]</u> - Assignee name should read AlliedSignal Inc.

<u>Column 1, line 5</u>, insert the following:

GOVERNMENT RIGHTS

This invention was made with Government support under contract F33615-92-C-224 awarded by the United States Air Force. The Government has certain rights in this invention.

TECHNICAL FIELD

The present invention relates to gas turbine engines, and in particular, to the exhaust housing of a gas turbine engine having a rotating shaft journalled by a non-oil lubricating bearing.

BACKGROUND OF THE INVENTION

In a conventional gas turbine engine, a rotating shaft is journalled on an oil lubricated bearing which is mounted in the engine's exhaust housing. To supply the bearing with oil, as well as for other purposes, a lubrication system is required. This system usually includes an oil pump, oil sump, oil cooler, pressure regulating valves, oil filters, piping, and various oil jets within the gas turbine engine.

Recently, bearings have been developed that do not require oil for lubrication. Examples of such bearings are foil or air bearings, and magnetic bearings. By using these types of bearings, the lubrication system can be eliminated or at least reduced in size and weight. However, exhaust gas temperatures in gas turbine engine exhaust housings can range from 1000°F to 1200°F. At these temperatures, magnetic bearings suffer a weight and input power penalty, while foil bearings suffer a degradation of their surface coatings.

UNITED STATES PATENT AND TRADEMARK OFFICE
CERTIFICATE OF CORRECTION

PATENT NO. : 5,450,719
DATED : Sep. 19, 1995
INVENTOR(S) : David N. Marsh

It is certified that error appears in the above-identified patent and that said Letters Patent is hereby corrected as shown below:

Thus, there is a need for an exhaust housing having means for providing a flow of cooling air to the non-oil lubricated bearing mounted therein.

Column 4, line 17 - "Carrier" should read "carrier".

Signed and Sealed this

Sixth Day of February, 1996

Attest:

BRUCE LEHMAN

Attesting Officer

Commissioner of Patents and Trademarks